(12) United States Patent  (10) Patent No.: US 8,954,699 B1
Chen et al.  (45) Date of Patent: Feb. 10, 2015

(54) TECHNIQUES FOR IDENTIFYING IO HOT SPOTS USING RANGE-LOCK INFORMATION

(75) Inventors: Xiangping Chen, Shrewsbury, MA (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 266 days.

(21) Appl. No.: 13/536,389

(22) Filed: Jun. 28, 2012

(51) Int. Cl.
  *G06F 12/00* (2006.01)
  *G06F 12/16* (2006.01)
(52) U.S. Cl.
  USPC ........... 711/165; 711/161; 711/162; 711/163; 711/167
(58) Field of Classification Search
  USPC .......................... 711/165, 161, 162, 163, 167
  See application file for complete search history.

(56) References Cited

U.S. PATENT DOCUMENTS

| 6,571,259 | B1 | 5/2003 | Zheng et al. |
| 7,783,682 | B1 | 8/2010 | Patterson |
| 7,870,356 | B1 | 1/2011 | Veeraswamy et al. |
| 8,195,614 | B2 | 6/2012 | Patterson |
| 2007/0050429 | A1 * | 3/2007 | Goldring et al. .............. 707/203 |

* cited by examiner

*Primary Examiner* — Yong Choe
(74) *Attorney, Agent, or Firm* — BainwoodHuang

(57) ABSTRACT

A technique of identifying IO hot spots is performed in a data storage apparatus (e.g., a file server). The technique involves updating, in response to host IO operations which lock ranges of extents prior to accessing the ranges of extents, contents of a lock history database based on the ranges of extents which were locked by the host IO operations. The technique further involves receiving a lock history request. The technique further involves providing, in response to the lock history request, the contents of the lock history database to identify, as the IO hot spots, extents which were locked by the host IO operations.

20 Claims, 6 Drawing Sheets

| LOCK TYPE 150 | LU ID/FILE ID 152 | TIME STAMP 154 | RANGE FIELDS 156 | |
|---|---|---|---|---|
| | | | STARTING OFFSET 158 | RANGE LENGTH 160 |
| READ | 1015 | 15:38:42 | 8 | 128 |
| WRITE | 1017 | 15:38:45 | 26 | 27 |
| READ | 1002 | 15:39:01 | 238 | 113 |
| READ | 1002 | 15:39:02 | 215 | 88 |
| WRITE | 1017 | 15:42:32 | 28 | 10 |
| WRITE | 998 | 15:44:01 | 30 | 16 |
| READ | 998 | 16:08:23 | 32 | 45 |
| READ | 1028 | 18:21:32 | 18 | 26 |
| . . . | . . . | . . . | . . . | . . . |

FIG. 4

TECHNIQUES FOR IDENTIFYING IO HOT SPOTS USING RANGE-LOCK INFORMATION

BACKGROUND

In general, data storage systems perform host IO (input/output) operations on behalf host devices. Along these lines, such data storage systems typically store host data within logical units (LUNs).

Some data storage systems collect access activity data on 1 Gigabyte (GB) LUN sections, i.e., LUN slices. These data storage systems then use such collected data to control the operation of various advanced data services. Data placement is an example of an advanced service which conventionally operates based on access activity collected at LUN slice granularity.

SUMMARY

Unfortunately, there are deficiencies to the above-described conventional approach to controlling advanced data services based on data collected at the LUN slice granular level. For example, in connection with data placement which places data among different storage tiers based on LUN slice activity, due to the coarse 1 GB granularity of a LUN slice, the conventional approach cannot distinguish between (i) one LUN slice which is accessed in an evenly distributed manner and (ii) another LUN slice having a few data blocks which are very active and large areas which are very inactive. Rather, both LUN slices would be treated in the same manner by the conventional approach even though it might be preferable to promote one of the LUN slices to a higher storage tier.

One might consider simply changing the level of granularity from a LUN slice to a data block (e.g., 8 KB, 4 KB, 512 bytes, etc.). Unfortunately, individually counting host IO operations at the data block level would be extremely costly in terms of overhead. That is, the processing time and the amount of memory required to track the number of host IO operations to each data block makes this alternative prohibitively expensive. Furthermore, this approach may cause fragmentation of the file system since each block would be counted individually without considering spatial locality of reference.

In contrast the above-described conventional approach to moving LUN slices among storage tiers based on the counted number of host IO operations for each LUN slice, an improved technique identifies IO hot spots based on ranges of extents of host IO operations. In particular, as host IO operations access ranges of extents on a data storage apparatus, locks on these ranges which are used to synchronize access to data (e.g., between a host IO operation and other system activities) can be tracked by a lock history database. IO hot spots (i.e., active extents) can then be identified from the information in the lock history database, and data storage services can be configured to smartly operate based on the identified IO hot spots such as an automated data placement service which places data among storage tiers. Such monitoring of range locks provides better precision than LUN slice granularity (e.g., the ability to identify one or more IO hot spots within a LUN slice). Additionally, such monitoring of range locks does not require a prohibitive amount of system resources. Rather, such monitoring provides a practical means to identify IO hot spots even when such IO hot spots are sprinkled in large areas of cold data.

One embodiment is directed to a method of identifying IO hot spots which is performed in a data storage apparatus (e.g., a file server). The method includes updating, in response to host IO operations which lock ranges of extents prior to accessing the ranges of extents, contents of a lock history database based on the ranges of extents which were locked by the host IO operations. The method further includes receiving a lock history request. The method further includes providing, in response to the lock history request, the contents of the lock history database to identify, as the IO hot spots, extents which were locked by the host IO operations.

In some arrangements, the lock history database includes range-lock entries, each range-lock entry identifying a respective host IO operation and a respective range of extents which was locked by the respective host IO operation. In these arrangements, updating the contents of the lock history database includes receiving an IO event message indicating a particular host IO operation and a particular range of extents which was accessed by the particular host IO operation, and adding a new range-lock entry to the lock history database. The new range-lock entry identifies the particular host IO operation and the particular range of extents which was locked by the particular host IO operation.

In some arrangements, each range-lock entry includes a lock type field, a storage object identifier field, a time stamp field, and a set of range fields. In these arrangements, adding the new range-lock entry to the lock history database includes:

(i) placing a lock type value in the lock type field of the new range-lock entry, the lock type value indicating whether the particular host IO operation imposed a read lock or a write lock on the particular range of extents, (ii) placing a storage object identifier in the storage object identifier field of the new range-lock entry, the storage object identifier identifying a particular storage object among multiple storage objects maintained for reading and writing by the data storage apparatus, (iii) placing a time stamp in the time stamp field of the new range-lock entry, the time stamp indicating a particular time in which the particular host IO operation locked the particular range of extents, and (iv) placing range data in the set of range fields to identify the particular range of extents which was locked by the particular host IO operation.

In some arrangements, a range of extents is defined by a starting offset and an extent length. In other arrangements, a range of extents is defined by a starting offset and an ending offset. Alternative ways of defining a range of extents are suitable for use as well.

One should appreciate that, among the deficiencies for a thin LUN (TLU), a range of the LUN could be spread out on multiple slices and, in this situation, the overall level of measured activity (i.e., temperature of the LUN) may increase. However, with IO hot spots identified based on locked ranges of extents, such IO hot spots are more precisely identified by LUN range.

Other embodiments are directed to systems, apparatus, processing circuits, computer program products, and so on. Some embodiments are directed to various methods, devices, electronic components and circuitry which are involved in identifying IO hot spots.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being

FIG. 4 is a block diagram of a portion of a lock history database which is managed by the data storage apparatus of FIG. 2.

DETAILED DESCRIPTION

Improved techniques identify IO hot spots based on ranges of extents which are locked while servicing host IO operations. In particular, as host IO operations access ranges of extents on a data storage apparatus, the locks on these ranges can be tracked by a lock history database. IO hot spots can then be identified from the information in the lock history database, and data storage services can be configured to smartly operate based on the identified IO hot spots. Such monitoring of range locks provides good spatial and temporal locality of reference information of IO access patterns. Furthermore, such monitoring of range locks does not require a prohibitive amount of system resources. Rather, such monitoring provides a practical means to identify IO hot spots even when such IO hot spots are sprinkled in large areas of cold data.

Figure 1:
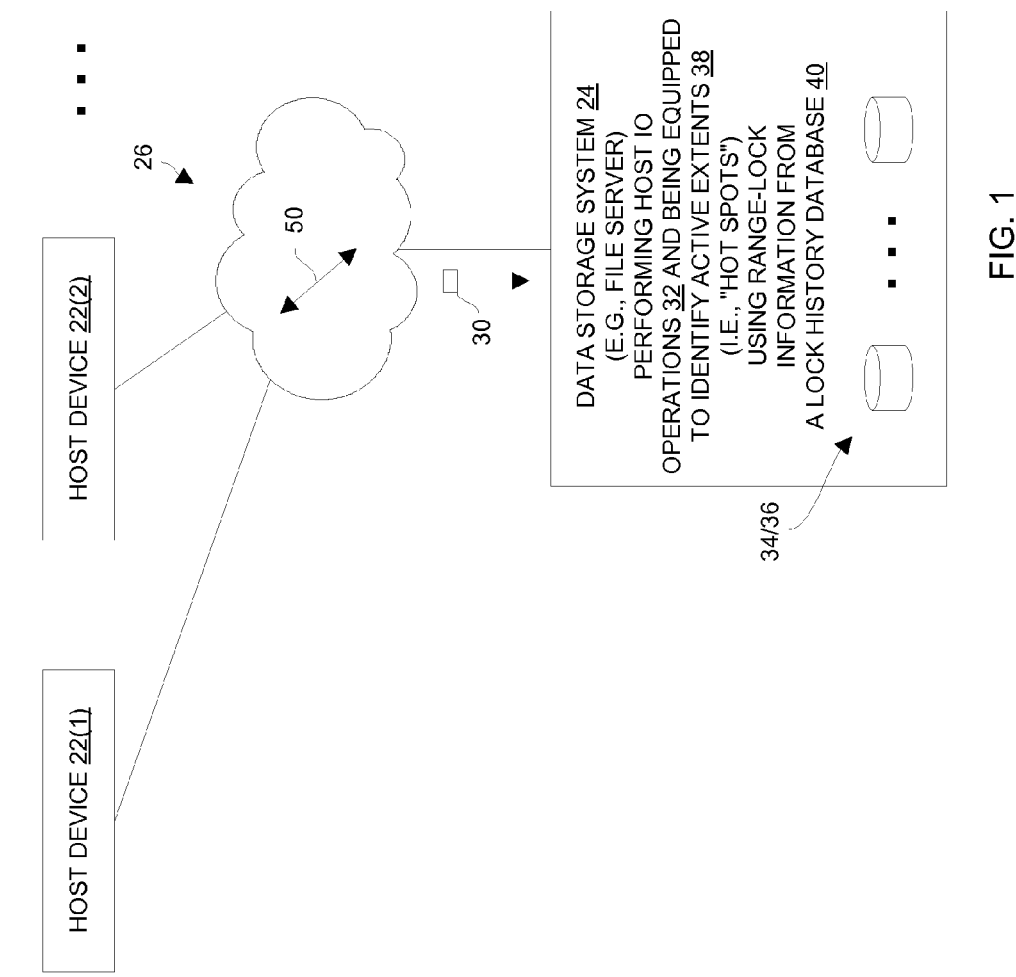
FIG. 1 is a block diagram of a data storage environment which includes a data storage apparatus equipped to identify IO hot spots using range-lock information.

FIG. 1 shows a data storage environment 20 which is equipped with IO hot spot identification using range-lock information. The data storage environment 20 includes host devices 22(1), 22(2), . . . (collectively, host devices 22), a data storage system 24, and a communications medium 26.

The host devices 22 are constructed and arranged to store host data into and load host data from the data storage system 24. Along these lines, each host device 22 provides host IOs 30 (e.g., read commands to read host data, write commands to write host data, etc.) to the data storage system 24 for processing.

The data storage system 24 is constructed and arranged to process the host IOs 30 from the host devices 22 by performing host IO operations 32 (e.g., read IOs, write IOs, etc. in response to the host IOs 30) on a set of LUNs 34. Each LUN 34 is partitioned into 1 GB slices 36, and each 1 GB slice 36 is partitioned into extents 38 (e.g., 8 KB data blocks). Such extents 38 are addressable (e.g., via logical block addressing or LBAs) and are mappable (e.g., to file system block numbers or FSBNs).

Additionally, the data storage system 24 is constructed and arranged to manage a lock history database 40 which stores range-lock information gathered while imposing range locks on ranges of extents 38 which are accessed by the host IO operations 32 performed on behalf of the host devices 22. As will be explained in further detail shortly, the data storage system 24 is able to identify active extents 38 (i.e., hot spots or frequently accessed extents 38) from the range-lock information stored in the lock history database 40 and adjust its operation based on such information.

The communications medium 26 connects the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

During operation, the data storage system 24 receives host IOs 30 from the host devices 22. In order to maintain data consistency, the data storage system 24 imposes locks on the extents 38 when processing the host IOs 30. For example, the data storage system 24 applies read (or shared) locks on ranges of extents 38 when the host devices 22 read host data from these ranges of extents 38. Furthermore, the data storage system 24 applies write (or exclusive) locks on ranges of extents 38 when the host devices 22 write host data to these ranges of extents 38.

As the data storage system 24 imposes range locks on the ranges of extents 38, the data storage system 24 updates the contents of the lock history database 40 based on these range locks. Accordingly, the data storage system 24 is then able to identify which extents 38 are active (or inactive) based on the contents of the lock history database 40. Further details will now be provided with reference to FIG. 2.

Figure 2:
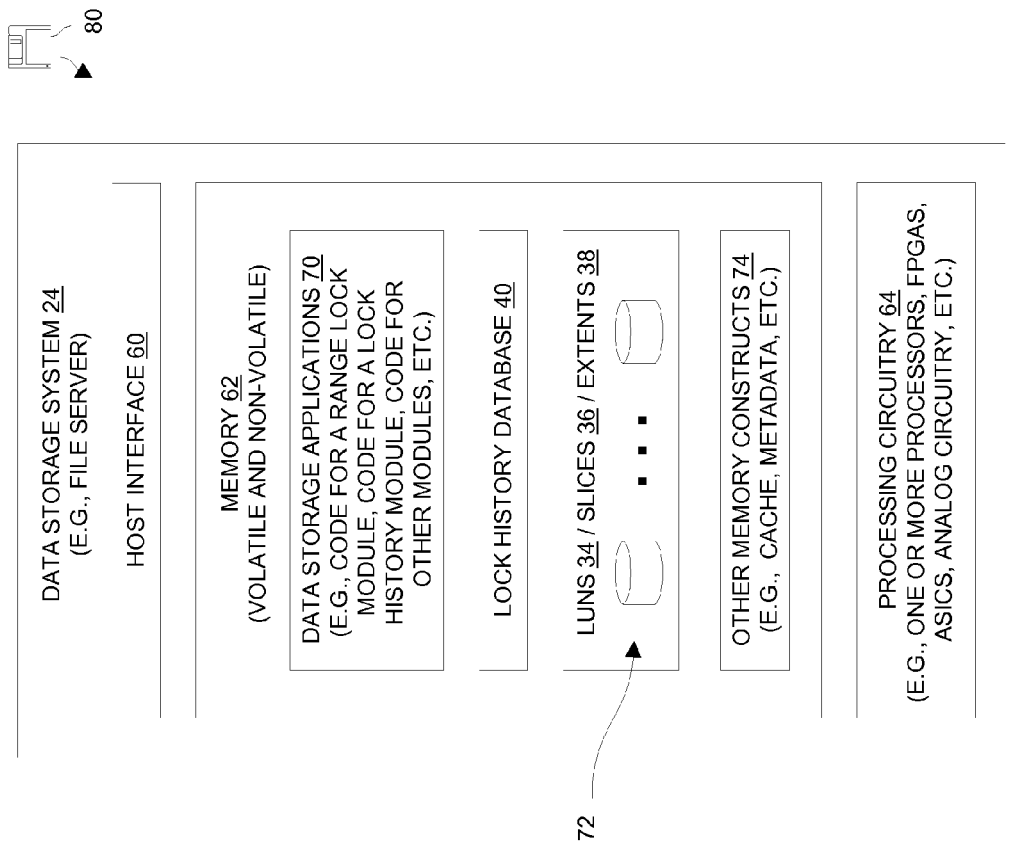
FIG. 2 is a block diagram of the data storage apparatus of FIG. 1.

FIG. 2 shows particular details of the data storage system 24 of the data storage environment 20 (also see FIG. 1). As shown in FIG. 2, the data storage system 24 includes a host interface 60, memory 62, and processing circuitry 64 among other things. The memory 62 includes a set of data storage applications 70, the lock history database 40, storage 72 for the above-mentioned LUNs 34, slices 36 and extents 38, as well as other memory constructs 74.

The host interface 60 is constructed and arranged to connect the data storage system 24 to the communications medium 26. Accordingly, the host interface 60 enables the data storage system 24 to communicate with the other components of the data storage environment 20 such as the host devices 22 (FIG. 1).

The memory 62 is intended to represent both volatile memory (e.g., DRAM, SRAM, etc.) and non-volatile memory (e.g., flash storage units, magnetic disk drives, etc.). The data storage applications 70 represent the operating system, drivers, utilities and tools, user-level applications, GUIs, and so on. The storage 72 represents memory which contains the host data. The other memory constructs 74 include additional memory-based items such as a buffer cache, metadata for locks, and so on.

In some arrangements, the storage 72 is tiered based on access speed. For example, the storage may include a first tier of flash memory, a second tier of SAS memory, and a third tier of near line SAS memory.

The processing circuitry 64 is constructed and arranged to perform load and store operations (i.e., to process host IOs 30) on behalf of the host devices 22 (FIG. 1). Additionally, the processing circuitry 64 is constructed and arranged to manage the contents of the lock history database 40 and to identify which extents 38 are active (or inactive) based on the contents of the lock history database 40.

It should be understood that the processing circuitry 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the data storage system 24. The computer program product 80 has a non-transitory (or non-volatile) computer readable medium which stores a set of instructions which controls one or more operations of the data storage system 24. Examples of suitable computer readable storage media include tangible articles of manufacture and apparatus which store instructions in a non-volatile manner such as CD-ROM, flash memory, disk memory, tape memory, and the like.

During operation, the data storage system 24 performs host IO operations 32 in response to the host IOs 30 received from the host devices 22 (also see FIG. 1). As the data storage system 24 imposes locks on ranges of extents 38 prior to accessing the ranges of extents 38, the data storage system 24 updates the contents of the lock history database 40 based on the ranges of extents 38 which were locked by the host IO operations 32.

With the contents of the lock history database 40 now available for analysis, the contents of the lock history database 40 are able to identify particular extents 38 which are active and inactive. As a result, the data storage system 24 is able to adjust its operation relying on precision which is better than a conventional approach which simply counts host IO operations for each LUN slice. Furthermore, the data storage system 24 is not overburdened with exhaustively counting host IO operations at the data block level which could be too costly to be practical. Further details will now be provided with reference to FIG. 3.

Figure 3:
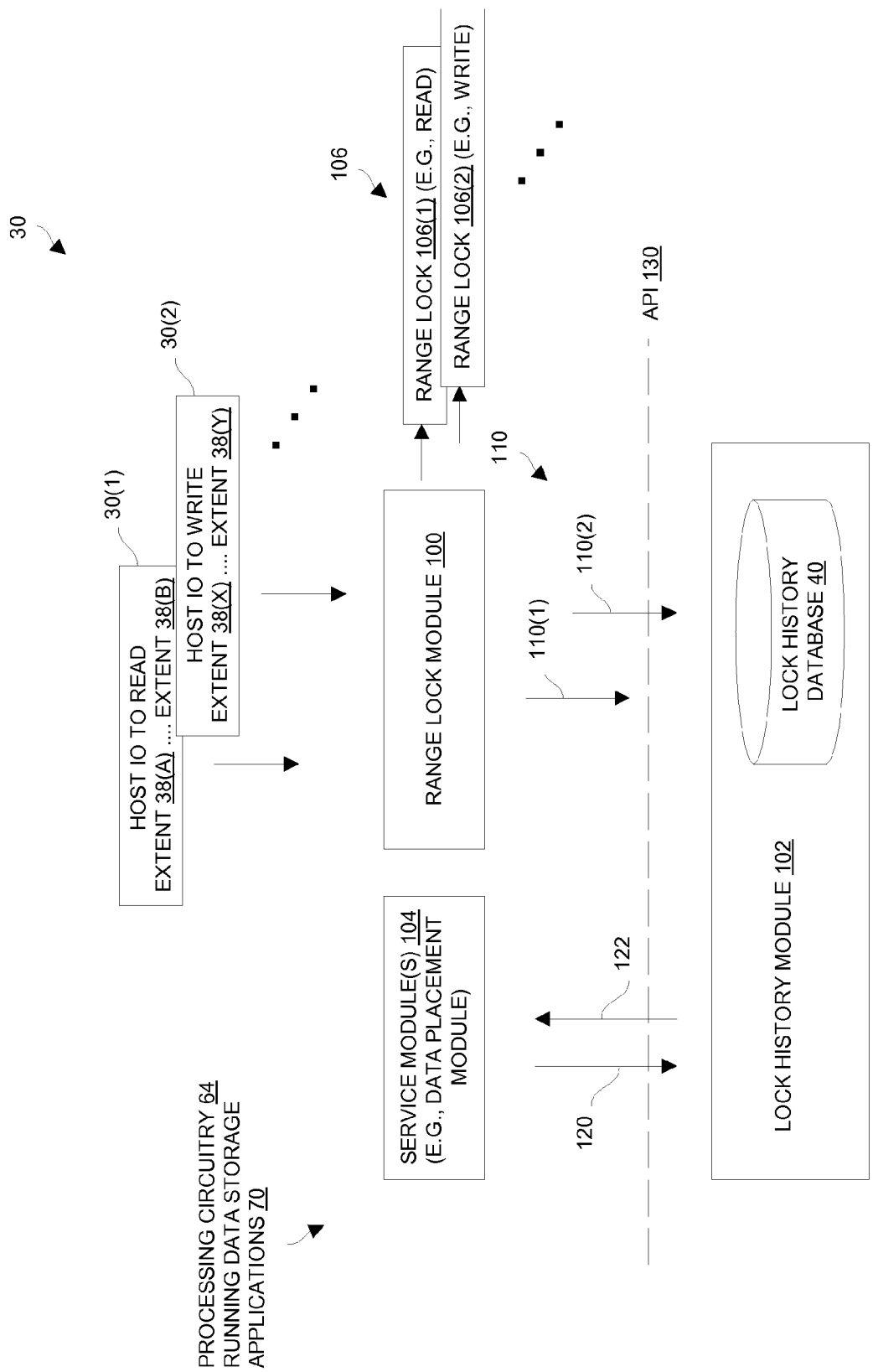
FIG. 3 is a block diagram of particular details of the data storage apparatus of FIG. 2.

FIG. 3 shows particular components of the data storage system 24 which are formed by the processing circuitry 64 when the processing circuitry 64 operates in accordance with the data storage applications 70 (also see FIG. 2). In particular, when the processing circuitry 64 executes code for a range lock module, the processing circuitry 64 forms a range lock module 100. Additionally, when the processing circuitry 64 executes code for a lock history module, the processing circuitry 64 forms a lock history module 102. Likewise, when the processing circuitry 64 executes service module code, the processing circuitry 64 forms a set of service modules 104, and so on.

The range lock module 100 is constructed and arranged to impose range locks 106 on ranges of extents 38 as the data storage system 24 performs the host IO operations 32, and thus preserve data coherency and consistency. By way of example, the range lock module 100 is shown as responding to a host IO 30(1) to read host data from extents 38(A), ..., 38(B) by providing, while a host IO operation 32 is being serviced, a read lock 106(1) (i.e., a shared lock) on extents 38(A), ..., 38(B). Additionally, the range lock module 100 is shown as responding to another host IO 30(2) to write host data to extents 38(X), ..., 38(Y) by providing a write lock 106(2) (i.e., an exclusive lock) on extents 38(X), ..., 38(Y).

The lock history module 102 is constructed and arranged to manage the lock history database 40. In particular, the lock history module 102 receives IO event messages 110 from the range lock module 100 which informs the lock history module 102 of the range locks 106 imposed by the range lock module 100. For example, when the range lock module 100 imposes the read lock 106(1) on extents 38(A), ..., 38(B), the range lock module 100 provides an IO event message 110(1) informing the range lock module 100 that a read lock 106(1) was imposed on the range of extents 38(A), ..., 38(B), and the lock history module 102 responds by adding an appropriate entry into the lock history database 40. Likewise, when the range lock module 100 imposes the write lock 106(2) on extents 38(X), ..., 38(Y), the range lock module 100 provides an IO event message 110(2) informing the range lock module 100 that a write lock 106(2) was imposed on the range of extents 38(X), ..., 38(Y), and the lock history module 102 responds by adding another appropriate entry into the lock history database 40.

As further shown by FIG. 3, the set of service modules 104 are able to communicate with the lock history module 102. For example, a service module 104 such as a data placement module may send a request signal 120 to the lock history module 102 to obtain the contents of the lock history database 40, e.g., recorded range-lock information. In response to the request signal 120, the lock history module 102 provides a response signal 122 containing the contents of the lock history database 40 thus enabling the data placement module to operate based on the contents of the lock history database 40.

In some arrangements, the range lock module 100 and the set of service modules 104 communicate with the lock history module 102 through an application programming interface (API) 130. That is, each module 100, 104 is able to call a predefined routine or issue a predefined instruction to the lock history module 102. Similarly, the lock history module 102 is able to call a predefined routine or issue a predefined instruction to the other modules 100, 104. Further details will now be provided with reference to FIGS. 4 and 5.

Figure 5:
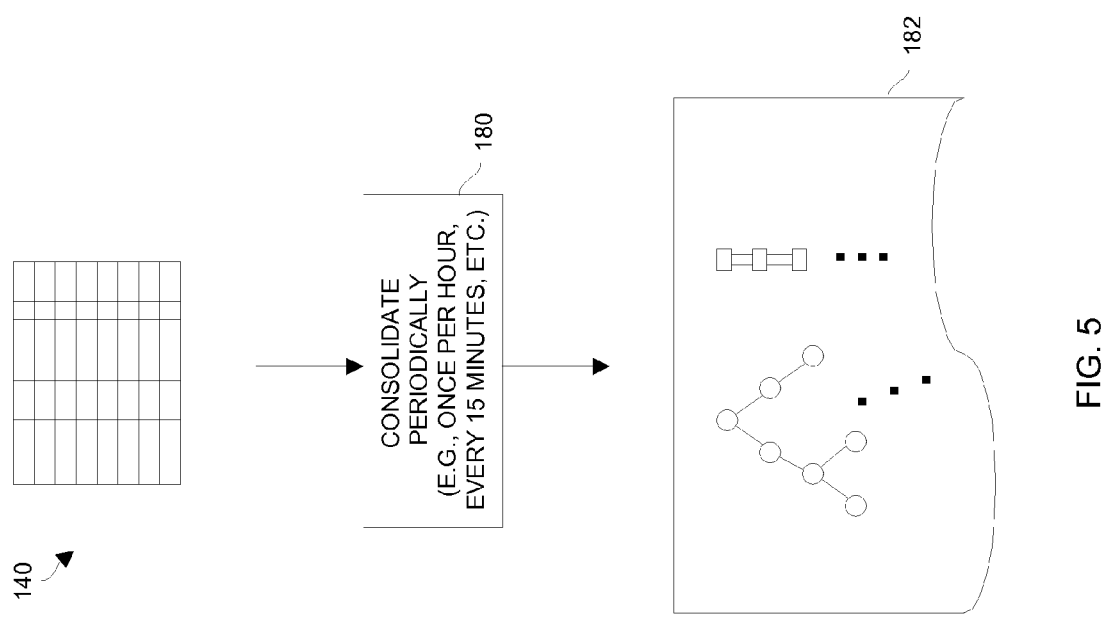
FIG. 5 is a block diagram of a consolidation process which is performed on the lock history database by the data storage apparatus of FIG. 2.

FIGS. 4 and 5 show particular details of the lock history module 102. In particular, FIG. 4 shows a set of range-lock entries 140 of the lock history database 40. FIG. 5 shows a consolidation operation which is periodically performed by the lock history module 102 on the set of range-lock entries 140 when managing the range-lock information of the lock history database 40.

As shown in FIG. 4, the lock history database 40 includes a set of range-lock entries 140. Each time the lock history module 102 receives an event message 110 informing the lock history module 102 of a new lock 106 imposed on a range of extents 38 from the range lock module 100, the lock history module 102 adds a new range-lock entry 140 in the lock history database 40 to record that lock 106 (also see FIG. 3).

Each range-lock entry 140 includes a lock type field 150, a storage object identifier field 152, a time stamp field 154, and a set of range fields 156. The fields of each range-lock entry 140 hold range-lock information corresponding to a range lock 106 imposed by the range lock module 100 during a particular host IO operation 32 thus recording the details of that range lock 106. In particular, the lock type field 150 holds a value indicating the type of lock (e.g., a read lock, a write lock, a new allocation lock, a de-allocation lock, etc.) for that range lock 106. The storage object identifier field 152 holds a storage object identifier to identify a storage object for that range lock 106, e.g., a particular logical unit (or file), among multiple storage objects maintained for reading and writing by the data storage system 24. The time stamp field 154 holds a time stamp indicating a particular time in which a particular host IO operation 32 locked the range of extents 38. The set of range fields 156 holds range data identifying the particular range of extents 38 which was locked by the particular host IO operation 32.

In some arrangements, the set of range fields 156 includes a starting offset field 158 and a range length field 160. The starting offset field of a range-lock entry 140 holds a starting offset of a particular range lock 106, and the range length field 160 holds the length of that particular range lock 106.

In other arrangements, the set of range fields 156 define range-locks differently. For example, in some arrangements, the set of range fields 156 simply includes a start offset field and an end offset field to hold the starting and ending offsets of a particular range lock 106.

FIG. 5 illustrates a process 180, which is performed by the lock history module 102 (FIG. 3), to consolidate the set of range-lock entries 140 of the lock history database 40 into aggregated lock data 182. Once the set of range-lock entries 140 is consolidated into the aggregated lock data 182, the set of range-lock entries 140 can be deleted from the lock history database 40 to reduce the amount of consumed memory 62. Such a process 180 is capable of being performed routinely (e.g., every hour, every 15 minutes, etc.) as well as manually (e.g., in response to a user command). As a result, the lock history database 40 includes a current set of range-lock entries 140 (i.e., range-lock entries 140 which have not yet been processed), aggregated lock data 182, or both if new range-lock entries 140 have been added since the consolidation process 180 was last performed.

Once a set of range-lock entries 140 has been processed to produce aggregated lock data 182, the aggregated lock data 182 indicates the extents 38 that had been identified by the set of range-locks 106. Accordingly, the aggregated lock data 182 identifies extents which have been recently accessed and which are thus considered active or "hot". Once the aggregated lock data 182 has been formed, future processing of a new set of range-lock entries 140 (i.e., range-lock entries 140 which have been added to the lock history database 40 since the last consolidation process 180) involves adjusting or updating the existing aggregated lock data 182 based on the new set of range-lock entries 140.

In some arrangements, when the lock history module 102 receives a request signal 120 for the contents of the lock history database 40 (FIG. 3), the lock history module 102 performs the consolidation process 180 on any existing range-lock entries 140 to update the aggregated lock data 182. The lock history module 102 then provides, as a response signal 122 (FIG. 3), only the aggregated lock data 182. For example, the response signal 122 may include a file or a pointer to a file containing just the aggregated lock data 182 or a copy of the aggregated lock data 182.

In some arrangements, the aggregated lock data 182 persists until it is cleared (e.g., in response to a user command to reset the values of the lock history database 40). In some arrangements, the lock history database 40 resides in non-volatile storage so that the lock history database 40 persists even during a reboot of the data storage system 24.

In some arrangements, the aggregated lock data 182 includes a mapping table which maps tallied access counts to each extent 38. In other arrangements, the aggregated lock data 182 includes nodes corresponding to time intervals (e.g., one hour ago, two hours ago, etc.) where each node identifies ranges of extents 38 which have been accessed within a particular time interval. Accordingly, the particular structure for the range-lock information in the aggregated lock data 182 may take a variety of forms, e.g., trees, linked lists, counters, combinations thereof, and so on.

One will appreciate that a variety of criteria may be used as a determining factor as to whether each extent 38 is active or inactive. In some arrangements, if the lock history database 40 indicates that an extent 38 was accessed within a predefined amount of time (e.g., an hour, six hours, etc.), the extent 38 is considered active. In other arrangements, if the lock history database 40 indicates that an extent 38 was accessed at least a certain predefined amount of times within a particular amount of time (e.g., at least 3 times within the last 24 hours, etc.), the extent 38 is considered active. Similarly, an extent 38 may be considered inactive if the extent 38 fails to satisfy the active criteria. Further details will now be provided with reference to FIG. 6.

Figure 6:
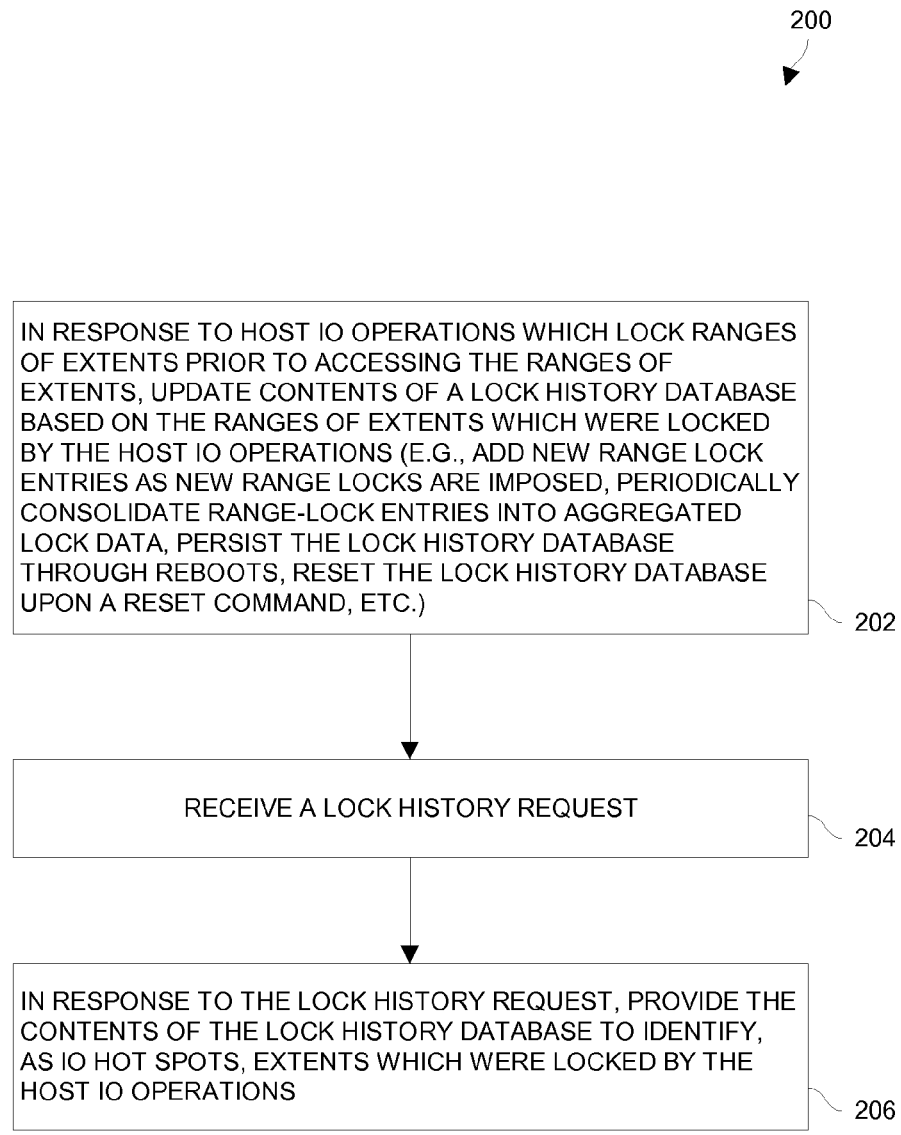
FIG. 6 is a flowchart of a procedure which is performed by the data storage apparatus of FIG. 2.

FIG. 6 shows a procedure 200 which is performed by the processing circuitry 64 of the data storage system 24, while operating as the lock history module 102, to identify IO hot spots (also see FIGS. 2 and 3). In step 202, the lock history module 102 updates the contents of the lock history database 40 based on the ranges of extents 38 which were locked by host IO operations 32. In particular, as the range lock module 102 locks ranges of extents 38 as part of the host IO operations 32, the range lock module 102 issues event messages 110 to the lock history module 102 informing the lock history module 102 of the range locks 106 (FIG. 3).

In step 204, the lock history module 102 receives a lock history request. For example, a service module 104 may provide a request signal 120 to the lock history module 102 requesting the contents of the lock history database 40.

In step 206, the lock history module 102 providing the contents of the lock history database 40 to identify, as the IO hot spots, extents 38 which were locked by the host IO operations 38. In particular, the lock history module 102 outputs a response signal 122 back to the requesting service module 104.

As described above, an improved technique identifies IO hot spots based on ranges of extents 38 which are locked by host IO operations 32. In particular, as host IO operations 32 access ranges of extents 38 on a data storage system 24, the locks 106 on these ranges can be tracked by a lock history database 40. IO hot spots (i.e., active extents 38) can then be identified from the information in the lock history database 40, and data storage services can be configured to smartly operate based on the identified IO hot spots. Such monitoring of range locks provides better precision than LUN slice granularity (e.g., the ability to identify one or more IO hot spots within a LUN slice). Additionally, such monitoring of range locks does not require a prohibitive amount of system resources. Rather, such monitoring provides a practical means to identify IO hot spots even when such IO hot spots are sprinkled in large areas of cold data.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the lock history database 40 may be updated with range-lock information just before, during or after the range of extents 38 is accessed. Accordingly, for implementations in which it is crucial to have range-lock information which is as accurate as possible, the lock history database 40 may be update just before or during each host IO operation 32. Alternatively, for implementations in which accuracy is not as critical, the lock history database 40 may be updated after each host IO operation 32.

Additionally, it should be understood that there is no restriction to the size of an extent 38. By definition, an extent 38 is simply part of a slice. Accordingly, an extent 38 may be relatively large (e.g., several Megabytes in size) or relatively small (e.g., the size of a standard data block). Regardless, the above-described improved techniques enable effective and efficient identification of IO hot spots at a finer level of granularity than a 1 GB LUN slice. Moreover, the above-described improved techniques consume significantly less resources than an alternative of simply counting accesses of each block of a data storage system. Such modifications and enhancements are intended to belong to various embodiments of this disclosure.

What is claimed is:

1. In a data storage apparatus, a method of identifying input/output (IO) hot spots, the method comprising:
   in response to host IO operations which lock ranges of extents prior to accessing the ranges of extents, updating contents of a lock history database based on the ranges of extents which were locked by the host IO operations;
   receiving a lock history request; and
   in response to the lock history request, providing the contents of the lock history database to identify, as the IO hot spots, extents which were locked by the host IO operations;
   wherein the lock history database includes range-lock entries, each range-lock entry identifying a respective host IO operation and a respective range of extents which was locked by the respective host IO operation; and wherein updating the contents of the lock history database includes:
      receiving an IO event message indicating a particular host IO operation and a particular range of extents which was locked by the particular host IO operation, and
      adding a new range-lock entry to the lock history database, the new range-lock entry identifying the particular host IO operation and the particular range of extents which was locked by the particular host IO operation.

2. A method as in claim 1 wherein each range-lock entry includes a lock type field, a storage object identifier field, a time stamp field, and a set of range fields; and wherein adding the new range-lock entry to the lock history database includes:
   placing a lock type value in the lock type field of the new range-lock entry, the lock type value indicating whether the particular host IO operation imposed a read lock or a write lock on the particular range of extents,
   placing a storage object identifier in the storage object identifier field of the new range-lock entry, the storage object identifier identifying a particular storage object among multiple storage objects maintained for reading and writing by the data storage apparatus,
   placing a time stamp in the time stamp field of the new range-lock entry, the time stamp indicating a particular time in which the particular host IO operation locked the particular range of extents, and
   placing range data in the set of range fields to identify the particular range of extents which was locked by the particular host IO operation.

3. A method as in claim 2, further comprising:
   storing the contents of the lock history database in non-volatile memory of the data storage apparatus to persist the contents of the lock history database during a reboot of the data storage apparatus.

4. A method as in claim 3, further comprising:
   receiving a reset request and clearing the contents of the lock history database stored in the non-volatile memory in response to the reset request.

5. A method as in claim 1 wherein providing the contents of the lock history database includes:
   outputting, as the contents of the lock history database, the range-lock entries to enable analysis of range-lock statistics defined by the respective host IO operations and the respective ranges of extents identified by the range-lock entries.

6. A method as in claim 1 wherein the lock history database further includes aggregated lock data; and wherein the method further comprises:
   adjusting the aggregated lock data of the lock history database based on the range-lock entries of the lock history database and, after the aggregated lock data is adjusted, removing the range-lock entries from the lock history database to consolidate the lock history database.

7. A method as in claim 6 wherein providing the contents of the lock history database includes:
   outputting, as the contents of the lock history database, the aggregated lock data to enable analysis of range-lock statistics defined by the respective host IO operations and the respective ranges of extents identified by the range-lock entries.

8. A method as in claim 6, further comprising:
   periodically adjusting the aggregated lock data based on new range-lock entries of the lock history database to consolidate the lock history database in an ongoing manner.

9. A method as in claim 1 wherein the data storage apparatus includes processing circuitry which is constructed and arranged to operate as (i) a range lock module which imposes read locks and write locks on ranges of extents, and (ii) a lock history module which manages the lock history database;
   wherein the method further comprises providing, by the processing circuitry while the processing circuitry operates as the range lock module, a procedure call from the range lock module to the lock history module, the procedure call providing the IO event message; and
   wherein receiving the IO event message and adding the new range-lock entry to the lock history database are performed by the processing circuitry while the processing circuitry operates as the lock history module.

10. A method as in claim 1 wherein the data storage apparatus includes processing circuitry which is constructed and arranged to operate as (i) a lock history module which manages the lock history database, and (ii) a service module which accesses the lock history module via procedure calls;
   wherein receiving the IO event message and adding the new range-lock entry to the lock history database are performed by the processing circuitry while the processing circuitry operates as the lock history module; and
   wherein the method further comprises providing, by the processing circuitry while the processing circuitry operates as the service module, a procedure call from the service module to the lock history module, the procedure call providing the lock history request to obtain the contents of the lock history database.

11. A method as in claim 1 wherein the data storage apparatus includes processing circuitry which is constructed and arranged to operate as (i) a range lock module which imposes read locks and write locks on ranges of extents, (ii) a lock history module which manages the lock history database, and (iii) a service module which accesses the lock history module via procedure calls;
   wherein the method further comprises providing, by the processing circuitry while the processing circuitry operates as the range lock module, a first procedure call from the range lock module to the lock history module, the first procedure call providing the IO event message;
   wherein receiving the IO event message and adding the new range-lock entry to the lock history database are performed by the processing circuitry while the processing circuitry operates as the lock history module; and
   wherein the method further comprises providing, by the processing circuitry while the processing circuitry operates as the service module, a second procedure call from the service module to the lock history module, the second procedure call providing the lock history request to obtain the contents of the lock history database.

12. A method as in claim 1 wherein the data storage apparatus includes (i) host storage within which the extents reside and (ii) other storage within which the lock history database resides, the other storage being different from the host storage; and wherein providing the contents of the lock history database in response to the lock history request includes outputting metadata from the other storage which is different from the host storage within which the extents reside.

13. A method as in claim 12 wherein the host storage includes a fast storage tier and a slow storage tier; and wherein the method further comprises:

moving host data from the slow storage tier to the fast storage tier based on the provided contents of the lock history database.

14. A method as in claim 12 wherein the host storage includes a fast storage tier and a slow storage tier; and wherein the method further comprises:

moving host data from the fast storage tier to the slow storage tier based on the provided contents of the lock history database.

15. A data storage apparatus, comprising:

a host interface;

memory which stores a lock history database; and processing circuitry coupled to the host interface and the memory, the processing circuitry being constructed and arranged to:

update, in response to host input/output (IO) operations which lock ranges of extents prior to accessing the ranges of extents, contents of the lock history database based on the ranges of extents which were locked by the host IO operations, receive a lock history request, and in response to the lock history request, provide the contents of the lock history database to identify, as IO hot spots, extents which were locked by the host IO operations;

wherein the lock history database includes range-lock entries, each range-lock entry identifying a respective host IO operation and a respective range of extents which was locked by the respective host IO operation; and wherein the processing circuitry, when updating the contents of the lock history database, is constructed and arranged to:

receive an IO event message indicating a particular host IO operation and a particular range of extents which was locked by the particular host IO operation, and add a new range-lock entry to the lock history database, the new range-lock entry identifying the particular host IO operation and the particular range of extents which was locked by the particular host IO operation.

16. A data storage apparatus as in claim 15 wherein each range-lock entry includes a lock type field, a storage object identifier field, a time stamp field, and a set of range fields; and wherein the processing circuitry, when adding the new range-lock entry to the lock history database, is constructed and arranged to:

place a lock type value in the lock type field of the new range-lock entry, the lock type value indicating whether the particular host IO operation imposed a read lock or a write lock on the particular range of extents, place a storage object identifier in the storage object identifier field of the new range-lock entry, the storage object identifier identifying a particular storage object among multiple storage objects maintained for reading and writing by the data storage apparatus, place a time stamp in the time stamp field of the new range-lock entry, the time stamp indicating a particular time in which the particular host IO operation locked the particular range of extents, and place range data in the set of range fields to identify the particular range of extents which was locked by the particular host IO operation.

17. A data storage apparatus as in claim 15 wherein the memory includes (i) host storage within which the extents reside and (ii) other storage within which the lock history database resides, the other storage being different from the host storage; and wherein the processing circuitry, when providing the contents of the lock history database in response to the lock history request, is constructed and arranged to output metadata from the other storage which is different from the host storage within which the extents reside.

18. A computer program product which has a non-transitory computer readable medium storing a set of instructions which, when executed by a computerized device, cause the computerized device to perform a method comprising:

updating, in response to host input/output (IO) operations which lock ranges of extents prior to accessing the ranges of extents, contents of a lock history database based on the ranges of extents which were locked by the host IO operations;

receiving a lock history request; and in response to the lock history request, providing the contents of the lock history database to identify, as the IO hot spots, extents which were locked by the host IO operations;

wherein the lock history database includes range-lock entries, each range-lock entry identifying a respective host IO operation and a respective range of extents which was locked by the respective host IO operation; and wherein updating the contents of the lock history database includes:

receiving an IO event message indicating a particular host IO operation and a particular range of extents which was locked by the particular host IO operation, and adding a new range-lock entry to the lock history database, the new range-lock entry identifying the particular host IO operation and the particular range of extents which was locked by the particular host IO operation.

19. A computer program product as in claim 18 wherein each range-lock entry includes a lock type field, a storage object identifier field, a time stamp field, and a set of range fields; and wherein adding the new range-lock entry to the lock history database includes:

placing a lock type value in the lock type field of the new range-lock entry, the lock type value indicating whether the particular host IO operation imposed a read lock or a write lock on the particular range of extents, placing a storage object identifier in the storage object identifier field of the new range-lock entry, the storage object identifier identifying a particular storage object among multiple storage objects maintained for reading and writing by the data storage apparatus, placing a time stamp in the time stamp field of the new range-lock entry, the time stamp indicating a particular time in which the particular host IO operation locked the particular range of extents, and placing range data in the set of range fields to identify the particular range of extents which was locked by the particular host IO operation.

20. A computer program product as in claim 18 wherein the computerized device includes (i) host storage within which the extents reside and (ii) other storage within which the lock history database resides, the other storage being different from the host storage; and wherein providing the contents of the lock history database in response to the lock history request includes outputting metadata from the other storage which is different from the host storage within which the extents reside.

\* \* \* \* \*